United States Patent

Flaxl

[11] Patent Number: 5,798,709
[45] Date of Patent: Aug. 25, 1998

[54] WIRELESS TRANSMITTER CARRIER PHASE SYNCHRONIZATION

[75] Inventor: Thomas Flaxl, Train, Germany

[73] Assignee: Texas Instruments Incorporated, Dallas, Tex.

[21] Appl. No.: 581,008

[22] Filed: Jan. 3, 1996

[51] Int. Cl.[6] .................................................. H04Q 1/00
[52] U.S. Cl. .................. 340/825.54; 235/497; 368/47; 395/551; 340/825.2; 340/825.22
[58] Field of Search .................. 340/825.2, 825.22, 340/825.54; 235/474, 497; 368/47; 395/551; 370/342; 375/107

[56] References Cited

U.S. PATENT DOCUMENTS

| | | | |
|---|---|---|---|
| 3,681,914 | 8/1972 | Loewengart | 340/825.2 |
| 3,810,161 | 5/1974 | Sahasrabudhe | 340/825.2 |
| 3,881,310 | 5/1975 | Gerum | 368/47 |
| 4,569,598 | 2/1986 | Jacobs | 368/47 |
| 4,680,582 | 7/1987 | Mejia | 340/825.2 |
| 4,918,416 | 4/1990 | Walton | 235/497 |
| 5,053,774 | 10/1991 | Schuermann et al. | |
| 5,263,172 | 11/1993 | Olnowich | 340/825.2 |
| 5,327,467 | 7/1994 | De Gaudenzi | 375/107 |
| 5,521,887 | 5/1996 | Loomis | 368/47 |
| 5,544,155 | 8/1996 | Lucas | 370/342 |
| 5,614,891 | 3/1997 | Zeinstra | 340/825.22 |

*Primary Examiner*—Brian Zimmerman
*Attorney, Agent, or Firm*—Rebecca Mapstone-Lake; Richard A. Stoltz; Richard L. Donaldson

[57] ABSTRACT

A master RF module (12), a slave RF module (20) without an internal oscillator, and additional circuitry (40) (52). A pick up coil (30) disposed perpendicular to the antenna (16) of the master RF module (12), is connected to the additional circuitry (40) (52). Transmission from the master RF module (12) is received by the pick up coil (30) and is filtered (42) (54), and amplified (44, 46) (64, 78) by the additional circuitry (40) (52). The amplified signal is used as an oscillator input (22) to the slave RF module (20) and is also converted into a square wave monoflop signal by square wave converter (48) (98) for enabling the transmitter control (24) of the slave RF module (20).

20 Claims, 1 Drawing Sheet

WIRELESS TRANSMITTER CARRIER PHASE SYNCHRONIZATION

BACKGROUND OF THE INVENTION

1. Field of the Invention

This invention relates to synchronization of signals and, more specifically, to the synchronization of wireless transmit carrier phase and transmit burst signals from radio frequency (RF) reading modules in a multiple reading module-transponder system.

2. Related Art

In a multiple reading module-transponder system, there are a plurality of reading modules (or reading units) geographically spaced and a plurality of transponders which communicate with the reading modules. Communication between a transponder and a reading module (or unit) is initiated by the reading module. Specifically, the reading module transmits a chargeup burst which powers the transponder and prompts the transponder to transmit information back to the reader module. Such a reading module-transponder system is well known in the art, and disclosed in, for example. U.S. Pat. No. issued to 5,053,774 to Schuermann et al., which is hereby incorporated by reference in its entirety.

When two or more modules, such as a transponder and a reading unit, operate in close proximity, in certain cases approximately three meters in distance but variable depending on antenna size, a problem occurs. In particular, when two or more modules which each have their own internal crystal oscillator transmit a charge-up burst, a beat effect on the charge-up field strengths is observed, as is well-known in the art, because the transmitter oscillator frequencies are never totally equal. When a charge-up field experiences this beat effect, shorter charge up distances may result due to the smaller field strength which periodically occurs. In addition, the beat effect may prevent the transponder from working properly when data (such as data effecting a write operation) is sent to the transponder by amplitude modulation.

Accordingly, there is a need in the art to provide a method and/or apparatus which would enable a system to employ multiple modules or units in close proximity without observing a beat effect on the charge-up field strengths.

The prior art solves this problem by synchronizing the transmit bursts from the reader unit to transmit simultaneously. This is done by retrofitting existing reading units with interfaces, designating one reading unit to be the master reading unit and the remaining units as slave units, and placing cables between the master reading unit and each slave unit. In operation, a master reading unit is operated from its internal crystal oscillator. The frequency signal from the oscillator is supplied to all the other slave units via cabling. Accordingly, all reading units are operated from one oscillator only and allows for synchronized transmit bursts from all the slave units simultaneously. In other words, transmit carrier phase synchronization is employed to avoid beat effects of charge-up field strength. In addition, this transmit carrier phase synchronization is accomplished by incurring the expense of placing potentially large lengths of cabling.

The method and apparatus provided by the prior art works quite well until an environment is encountered in which it is not easy or even possible to connect the modules or units by cabling. For example, it may be cost prohibitive to cut the concrete floor of an office and lay conduit for cabling of several meters in length, and yet it would be unsafe to allow the cabling to remain exposed on the floor. Even if adequate facilities exist to allow cable to be placed properly, it may be cost prohibitive to, for example, place cable from numerous slave RF modules to a single master RF module; moreover, it would be physically impossible to meet the wiring demands of numerous cables attempting joinder with a single master RF module without incurring the cost of designing or otherwise providing an entirely new interface. In these cases, there is no way to employ transmit carrier phase synchronization because of the inability to connect the master and slave modules together to achieve operation from a common transmitter oscillator frequency.

Accordingly, there is a need in the art to provide an alternate method and/or apparatus which eliminates the constraint that cabling imposes and provides wireless transmit carrier phase synchronization.

SUMMARY OF THE INVENTION

It is in view of the above problems that the present invention was developed. The invention is a method and apparatus which eliminates the need for physical cabling, and yet provides transmit carrier phase synchronization while simultaneously avoiding the beat effect. The invention comprises a master RF module equipped with an antenna and internal oscillator, a slave RF module equipped with an antenna, oscillator input, and transmitter control, and additional circuitry which replaces a slave internal oscillator. A pick up coil, disposed perpendicular to the antenna of master RF module, is connected to the additional circuitry. Transmission from the master RF module is received by the pick up coil and is filtered and amplified by the additional circuitry. The amplified signal is used as an oscillator input to the slave RF module and is also converted into a square wave monoflop signal for operating the transmitter control of the slave RF module.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
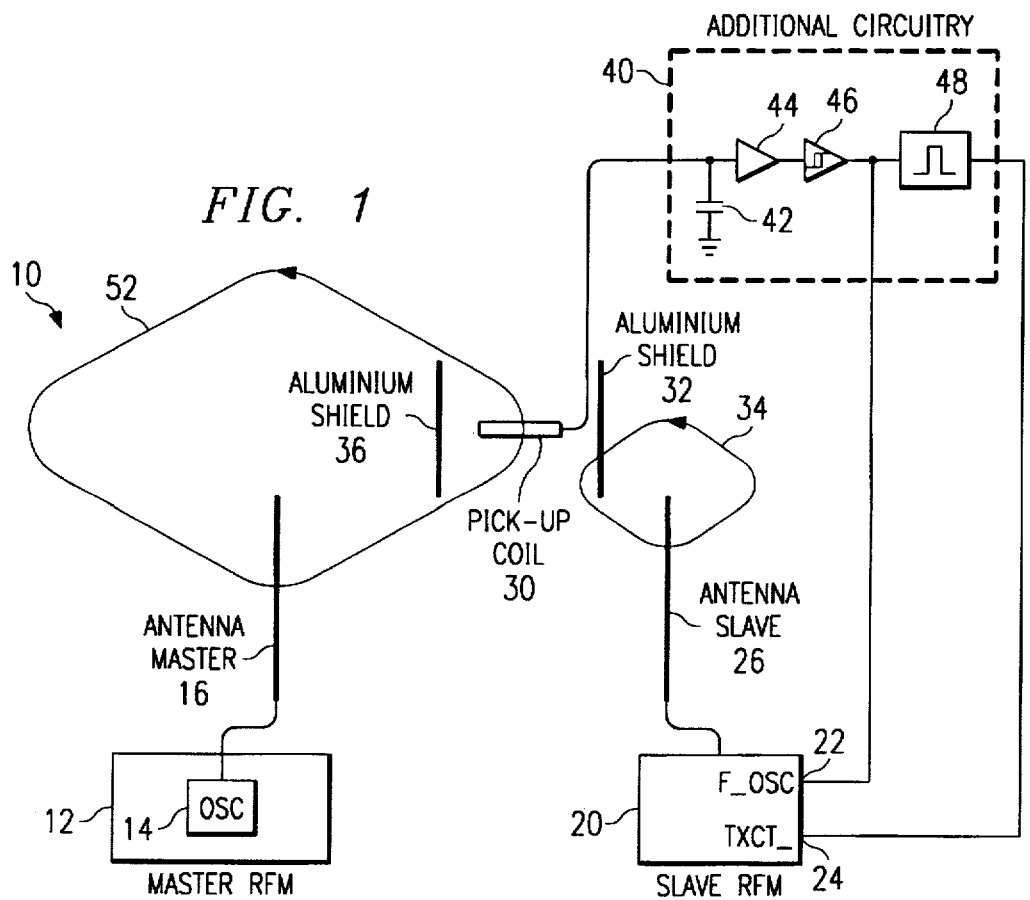
FIG. 1 illustrates the wireless transmit carrier phase and transmit burst synchronization system embodying the present invention.

Referring to the accompanying drawings in which like reference numbers indicate like elements, in FIG. 1 the system which synchronizes transmit carrier phase and transmit burst communication without the use of cables is shown generally at 10. System 10 includes, in part, master radio frequency (RF) module 12 which comprises an internal oscillator 14, and antenna 16 connected to oscillator 14.

System 10 also includes, in part, slave RF module 20 which comprises an oscillator input 22, transmitter control 24, and antenna, 26 which communicates with oscillator input 22 and transmitter control 24.

System 10 further includes, in part, a pick up coil 30 disposed between master RF module 12 and slave RF module 20, and perpendicularly to both antenna 16 of master RF module 12, and to antenna 26 of slave RF module 20. Pick up coil 30 is shielded by aluminum shield 32 disposed between pick up coil 30 and antenna 26 of slave RF module 20. Aluminum shield 32 is oriented perpendicular to the field lines 34 generated by antenna 26 of slave RF module 20. Accordingly, aluminum shield 32 prevents feedback by an emerging charge-up burst oscillator signal emitted from antenna 26. Optionally, an aluminum shield 36 may also be deployed between pick up coil 30 and master RF module 12 for similar reasons, although the present invention clearly contemplates that aluminum shield 36 may be omitted as required by the specific situation.

It should be pointed out that shields 32 and 36 are made from aluminum. Although the aluminum material may perform best it is not necessarily the critical feature and thus it is clearly contemplated that for the aluminum there may be substituted any other material in various shapes or sizes which perform he similar function of shielding.

Pick up coil 30 is connected to additional circuitry illustrated in a block diagram 40 in a dashed box. Block diagram 40 comprises filtering capacitor 42 in parallel with amplifier 44 connected in series to buffer/amplifier 46. The output from buffer/amplifier 46 is connected to both oscillator input 22 and a square wave converter 48. The output from square wave converter 48 is connected to transmitter control 24.

In use, system 10 (operating here at approximately 134.2 kHz) observes a beat effect on chargeup bursts when the master RF module 12 and slave RF module 20 are separated by a distance of approximately three meters or less. However, it is clearly contemplated at this distance will vary, depending on the operating frequency of system 10, e.g., lower frequencies observing a beat effect over longer distances, and depending on antenna size as is well-known in the art. To eliminate the beat effect observed, the slave RF module 20 must match the frequency of the master RF module. 12 and must also provide a stable phase relationship.

Under the present invention, the frequency of the master RF module 12 is fixed by internal oscillator 14. When master RF module 12 transmits via antenna 16, as illustrated by field line 52, pick up coil 30 picks up the transmission. The transmission is then filtered by filtering capacitor 42, and amplified by amplifiers 44 and 46. The output of the amplifier is connected to oscillator input 22. Accordingly, slave RF module 20 will operate on the exact frequency as transmitted by master RF module 12 and thereby avoids any beat effect from being observed in system 10. Specifically, because oscillator input 22 operates from the same frequency as master RF module 12, a frequency match and a stable phase relationship are achieved, thereby avoiding the conditions which create a beat effect.

Important to the present invention is that transmitter control 24 enables transmission by the slave RF module 20 on and off. Square wave converter 48 converts the analog frequency transmission to a square wave signal monoflop signal which is then connected to transmitter control 24 of slave RF module 20. The monoflop signal enables transmitter control 24. In other words, when the pick up coil receives a transmission from the master RF module 12, square wave converter 48 produces a monoflop signal which enables transmission by slave RF module 20 via transmitter control 24. Again, using system 10 operating at 134.2 kHz, the period of such frequency is approximately 7.5 microseconds. The transmitter control 24 is set for a predetermined time period according to the frequency used by system 10. Based on the present 134.2 kHz system, the transmitter control 24 is set on a predetermined 10 microsecond period. Accordingly, when master RF module 12 transmits, a monoflop square wave signal should be generated at least every 7.5 microseconds which enables transmitter control 24 and allows slave RF module 20 to transmit. However, when master RF module 12 ceases to transmit, no square wave signal is produced because the monoflop falls to its idle state. When no square wave signal is received during an approximately 10 microseconds time period by slave RF module 20, transmitter control 24 becomes non-enabled (disabled) and slave RF module 20 ceases to transmit.

Shield 32 prevents transmissions from the antenna 26 of slave RF module 20 from being received by pick up coil 30. In doing so, shield 32 prevents an unstable feedback problem from developing. Similarly, shield 36 may be optionally employed if necessary to prevent any non-antenna 16 transmitted noise from degrading the signal received by pick up coil 30.

As a result, the present invention enables a system 10 to employ multiple modules 12, 20, in close proximity without observing a beat effect on the charge-up field strengths by eliminating the constraint that cabling imposes and providing wireless transmit carrier phase synchronization.

Figure 2:
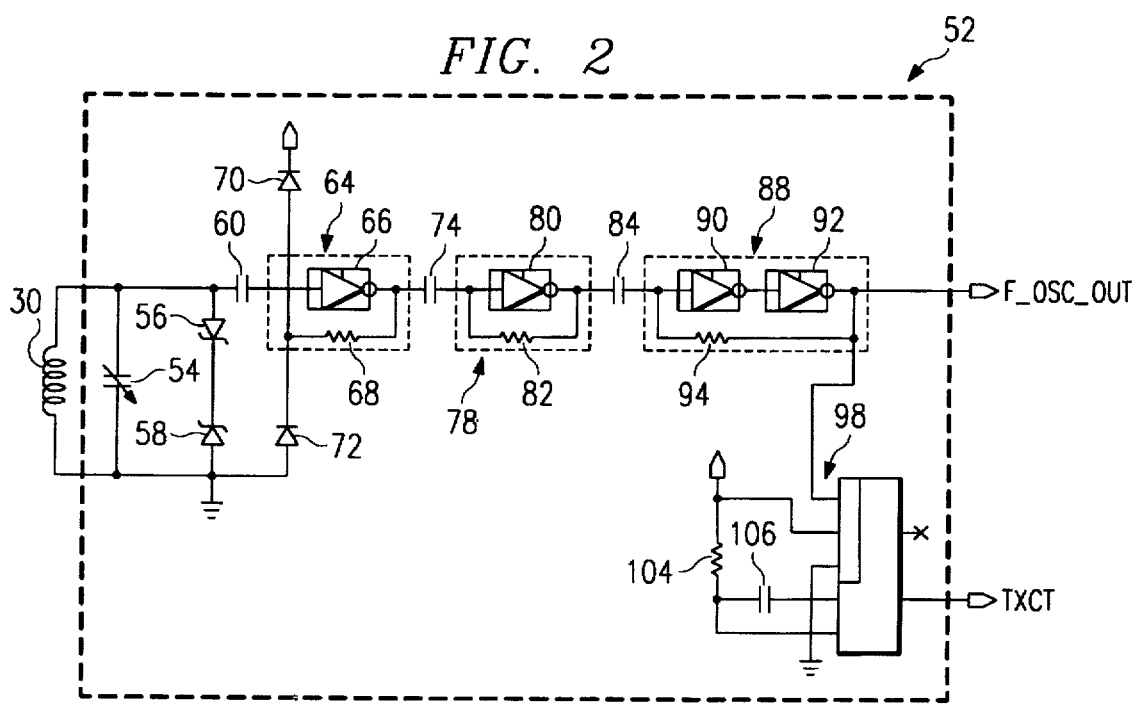
FIG. 2 illustrates a specific circuit design for processing signals transmitted by a master RF module in the present invention.

In an alternate embodiment in FIG. 2, specific circuitry, shown generally at 52, illustrated in a dashed box, may be used as a working example model of the general block diagram 40 shown in FIG. 1. Accordingly, specific circuitry 52 is connected to pick up coil 30 having a value of 2.5 mH. Specific circuitry 52 comprises a capacitor (resonator) 54, voltage-clamping diodes 56 and 58, coupling capacitor 60, first amplifier shown generally at 64 which comprises simple CMOS inverter 66 and feekback resistor 68, voltage clamping diodes 70 and 72, coupling capacitor 74, second amplifier shown generally at 78 which comprises simple CMOS inverter 80 and feedback resistor 82, coupling captor 84, Schmitt trigger circuit shown generally at 88 which comprises first CMOS amplifier 90, second CMOS amplifier 92 and feedback resistor 94, square wave monoflop converter 98, resistor 104, and capacitor 106.

In the embodiment shown in FIG. 2 in use, oscillator signal pick up coil 30 receives the signal transmitted by master RF module 12 and is connected to capacitor 54, which filters the signal. It is noted that pick up coil 30 is disposed perpendicular to antenna 16 of master RF module 12 and between antenna 16 of master RF module 12 and antenna 26 of slave RF module 20. In addition, similar to the embodiment of FIG. 1, shield 32 is disposed between the antenna 26 of slave RF module 20 and pick up coil 30. Capacitor 54 is adjustable, in order to set the resonance frequency to the predetermined transmit frequency, in this case 134.2 kHz. However, it is clearly contemplated that a different pre-determined frequency may be used and capacitor 54 may be adjusted accordingly. In the present circuit, capacitor 54 is a 390 picofarad (pF) capacitor. Clearly, the specific values for pick up coil 30 and capacitor 54 are varied according to the frequency, and, even given a frequency, may be varied to according to the parts available.

Diodes 56 and 58 are used to clamp excessive voltages which may occur when the pick up coil is placed to close to an antenna such as antenna 16 of master RF module 12. Any Zener diode with a Power rating of 0.25 W can be used for either diode 56 or 58. Coupling capacitor 60 couples the received signal which has been filtered and cleared of too high voltages to first amplifier 64. Capacitor 60 comprises a 10 pF capacitor, although any capacitor value in the range from 5 pF to 100 pF may be used. However, it is important to note that capacitor 60 affects the resonance tuning of pick up coil 30 and capacitor 54.

As is well-known in the art, first amplifier 64 comprises a simple CMOS inverter 66 and feedback resistor 68 ranging from 1M to 10M. Diodes 70 and 72 are used to clamp excessive voltages, and any general purpose diode can be used. The output of amplifier 64 carrying amplified signal is then coupled via capacitor 74 to second amplifier 78. Any capacitor value can be used for capacitor 74 with the only limitation that it must be chosen consistent with the frequency range in use. Second amplifier 78 may range in value from 1M to 10M.

Capacitor 84 (any appropriate coupling value, but limited by the frequency range in use) couples the output of second amplifier 78 to Schmitt trigger circuit 88. The output of Schmitt trigger circuit 88, which is the oscillator signal, is connected to oscillator input 22 shown in FIG. 1. Resistor 82 of Schmitt trigger circuit 88 needs to range from 10 k to 1M.

The output of Schmitt trigger circuit 88 is also connected to square wave monoflop converter 98 which consists of a TTL circuit SN74LS123. The monoflop time constant is pre-determined by resistor 104 and capacitor 106, as is well-known in the art, and is set according to the frequency range in use. In the case of a system operating at 134.2 kHz, a time period of approximately 10 microseconds is set using a 33 k resistor 104 and a 1 NF capacitor 106. The output of square wave monoflop converter 98 is connected to and directly operates transmitter control 24 of slave RF module 20.

In view of the foregoing, it will be seen that the several objects of the invention are achieved and other advantages are attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, if system 10 operated at a frequency other than 134.2 kHz, the transmitter control 24 would be set for an appropriate period based on the period of the entire system. Moreover, a beat effect is observed in a system 10 operating at 134.2 kHz where the distance between the master RF module 12 and slave RF module 20 is approximately 3 meters or less. Clearly, the present invention would also encompass a system 10 which operates at a frequency other than 134.2 with appropriate adjustments to the period of the transmitter control 24, the use of aluminum shield 32 and optional aluminum shield 36, and the various values of specific circuitry 52. While the various values of specific circuitry 52 may be adjusted based on the operation frequency and parts available, the changes will all be consistent with the intent of block diagram 40 of the present invention. Thus, the breadth and scope of the present invention should not be limited by any of the above-described exemplary embodiments, but should be defined only in accordance with the following claims appended hereto and their equivalents.

What is claimed is:

1. A method of synchronizing transmit carrier phase signals between remotely disposed master and slave RF modules comprising the steps of:

transmitting an oscillator signal from a master RF module having an antenna;

placing an oscillator signal pick up coil between said antenna of said master RF module and an antenna of a slave RF module;

remotely receiving the transmitted oscillator signal from said master RF module with said pick up coil;

amplifying the transmitted oscillator signal received by said pick up coil; and using said amplified signal as the oscillator input signal to said slave RF module.

2. A method of synchronizing transmit carrier phase signals according to claim 1, wherein the step of placing an oscillator signal pick up coil between said master RF module and a slave RF module further comprises the step of:

placing said pick up coil perpendicular to said module antenna of said master RF module.

3. A method of synchronizing transmit carrier phase signals according to claim 1, further comprising the step of:

placing a shield between said antenna of said slave RF module and said pick up coil.

4. A method of synchronizing transmit carrier phase signals according to claim 3, further comprising the step of:

simultaneously disposing said shield between said antenna of said slave RF module and said pick up coil, and parallel to said antenna of said slave RF module.

5. A method of synchronizing transmit carrier phase signals according to claim 1, further comprising the step of:

filtering the transmitted oscillator signal received by said pick up coil with a filter before the step of amplifying the transmitted oscillator signal.

6. A method of synchronizing transmit carrier phase signals according to claim 1, further comprising the steps of:

converting said amplified signal to a square wave monoflop signal;

using the square wave monoflop signal as control signal transmission from said slave RF module.

7. A method of synchronizing transmit carrier phase signals according to claim 6, further comprising the steps of:

amplifying the signal a second time before the step of converting said amplified signal to a square wave monoflop signal.

8. A method of synchronizing transmit carrier phase signals according to claim 6, wherein the step of using the square wave monoflop signal as control signal transmission from said slave RF module comprises the steps of:

setting a transmitter control which enables transmission upon detection of the square wave monoflop signal within a predetermined period of time; and setting a transmitter control which disables transmission upon failure to detect the square wave monoflop signal within a predetermined period of time.

9. An apparatus for synchronizing transmit carrier phase signals, comprising:

a master RF module having an internal crystal oscillator and an antenna;

a slave RF module having an oscillator input and an antenna;

a pick up coil having an output, said pick up coil being disposed between said antenna of said master RF module and said antenna of said slave RF module; and an amplifier having an input and an output, said input being connected to said output of said pick up coil, and said output of said amplifier connected to said input of said oscillator input of said slave RF reading module.

10. An apparatus for synchronizing transmit carrier phase signals according to claim 9, wherein said slave RF module further comprises an antenna, and wherein said pick up coil is disposed perpendicular to said antenna of said slave RF module.

11. An apparatus for synchronizing transmit carrier phase signals according to claim 9, further comprising:
   a shield disposed between said slave RF module and said pick up coil.

12. An apparatus for synchronizing transmit carrier phase signals according to claim 11, wherein said shield is disposed parallel to said antenna of said slave RF module.

13. An apparatus for synchronizing transmit carrier phase signals according to claim 11, wherein said shield is made from aluminum.

14. An apparatus for synchronizing transmit carrier phase signals according to claim 9, further comprising:
   a second shield disposed between said slave RF module and said pick up coil and parallel to said antenna of said master RF module.

15. An apparatus for synchronizing transmit carrier phase signals according to claim 14, wherein said second shield is made from aluminum.

16. An apparatus for synchronizing transmit carrier phase signals according to claim 9, further comprising:
   a filter connected to said output of said pick up coil.

17. An apparatus for synchronizing transmit carrier phase signals according to claim 9, wherein said slave RF module further comprises:
   a transmitter control having an input.

18. An apparatus for synchronizing transmit carrier phase signals according to claim 17, further comprising:
   a square wave converter having an input and an output, said input being connected to said output of said amplifier, and said output being connected to said input of said transmitter control of said slave RF module.

19. An apparatus for synchronizing transmit carrier phase signals according to claim 18, wherein said square wave converter comprises TTL circuit SN74LS123.

20. An apparatus for synchronizing transmit carrier phase signals according to claim 17, wherein said transmitter control enables transmission by said slave RF module upon receipt of a monoflop signal within a predetermined time period.

* * * * *